US012666192B2

(12) United States Patent
Jain et al.

(10) Patent No.: US 12,666,192 B2
(45) Date of Patent: Jun. 23, 2026

(54) CAPACITIVE IN EAR DETECT ON EARPHONES

(71) Applicant: Apple Inc., Cupertino, CA (US)

(72) Inventors: Karan S. Jain, San Jose, CA (US); Michael M. Nannini, Dublin, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 18/737,837

(22) Filed: Jun. 7, 2024

(65) Prior Publication Data

US 2025/0106546 A1 Mar. 27, 2025

Related U.S. Application Data

(60) Provisional application No. 63/539,899, filed on Sep. 22, 2023.

(51) Int. Cl.
*H04R 1/10* (2026.01)

(52) U.S. Cl.
CPC ......... *H04R 1/1058* (2013.01); *H04R 1/1016* (2013.01); *H04R 2420/07* (2013.01)

(58) Field of Classification Search
CPC . H04R 1/1016; H04R 1/1058; H04R 2420/07
See application file for complete search history.

(56) References Cited

U.S. PATENT DOCUMENTS

| | | | | |
|---|---|---|---|---|
| 6,373,264 | B1 * | 4/2002 | Matsumoto | G01D 5/2405 324/680 |
| 10,003,881 | B2 | 6/2018 | Cousins et al. | |
| 11,785,372 | B2 | 10/2023 | Panecki et al. | |
| 11,979,703 | B2 | 5/2024 | McIntosh et al. | |
| 2019/0098388 | A1 * | 3/2019 | Powell | H04R 1/105 |
| 2019/0297408 | A1 * | 9/2019 | Mohammadi | H04R 1/1016 |
| 2020/0100010 | A1 * | 3/2020 | Yang | H04R 1/10 |
| 2023/0269514 | A1 | 8/2023 | Cousins et al. | |

OTHER PUBLICATIONS

Islam, Tarikul. Advanced Interfacing Techniques for the Capacitive Sensors. 2017, pp. 73-109. (Year: 2017).*

* cited by examiner

*Primary Examiner* — James K Mooney
(74) *Attorney, Agent, or Firm* — Kilpatrick Townsend & Stockton LLP

(57) ABSTRACT

An earphone comprising: a device housing that defines an internal cavity within the device housing; an acoustic port formed through the device housing and having an opening at an exterior surface of the device housing; an audio driver disposed within the device housing and aligned to emit sound through the acoustic port; a plurality of capacitive pixels disposed within the internal cavity, wherein at least two of the capacitive pixels are disposed radially around the acoustic port and spaced apart from each other by at least 90 degrees; and sensor control circuitry disposed within the internal cavity and operatively coupled to drive the plurality of capacitive pixels at a predetermined frequency to readout a capacitance at each of the plurality of capacitive pixels and determine if the earphone is within an ear of a user.

14 Claims, 9 Drawing Sheets

CAPACITIVE IN EAR DETECT ON EARPHONES

CROSS-REFERENCES TO OTHER APPLICATIONS

This application claims priority to U.S. Provisional Application No. 63/539,899, for "CAPACITIVE IN EAR DETECT ON EARPHONES" filed on Sep. 22, 2023, which is herein incorporated by reference in its entirety for all purposes.

BACKGROUND

Portable listening devices, such as headphones, can be used with a wide variety of electronic devices including portable media players, smart phones, tablet computers, laptop computers, and stereo systems among others. Portable listening devices have historically included one or more small speakers configured to be place on, in, or near a user's ear, structural components that hold the speakers in place, and a cable that electrically connects the portable listening device to an audio source.

A growing trend has been the increased popularity of small, wireless headphones that fit within the ear of a user, referred to herein as "wireless earphones". Wireless earphones do not include a cable between the audio source and earphones. Instead, wireless earphones wirelessly receive a stream of audio data from a wireless audio source. Such wireless earphones require a battery to operate circuitry, including speakers and wireless circuitry, within the earphones.

While wireless earphones have many advantages over wired portable listening devices and have become a very popular with consumers, improved wireless earphones are desirable.

BRIEF SUMMARY

The present disclosure describes various embodiments of earphones, including wireless earphones, that can enable a user to experience high-end acoustic performance and a pleasant, positive user experience. Some embodiments include multiple capacitive pixels strategically positioned along an exterior surface of a portion of the earphone housing that fits within the ear of a user. The capacitive pixels can provide signals to a controller or other circuitry that can then detect when the earphones are positioned within a user's ear and adjust the operating mode of the earphones accordingly. Thus, for example, when the controller or other circuitry detects that the earphones are removed from a user's ear, the earphones can be placed in a low power mode which requires less energy than normal (active) operating modes. In this manner the low power mode saves battery power improving a user's experience with the earphones by allowing the earphones to remain operational longer on a single charge and/or be charged less frequently than otherwise might be required.

An earphone according to some embodiments includes: a device housing that defines an internal cavity within the device housing; an acoustic port formed through the device housing and having an opening at an exterior surface of the device housing; an audio driver disposed within the device housing and aligned to emit sound through the acoustic port; a plurality of capacitive pixels disposed within the internal cavity, wherein at least two of the capacitive pixels are disposed radially around the acoustic port and spaced apart from each other by at least 90 degrees; and sensor control circuitry disposed within the internal cavity and operatively coupled to drive the plurality of capacitive pixels at a predetermined frequency to readout a capacitance at each of the plurality of capacitive pixels and determine if the earphone is within an ear of a user.

In some embodiments and earphone includes: a device housing that includes a housing wall that defines both an exterior surface of the earphone and an interior surface of the device housing; an acoustic port formed through the device housing and having an opening at an exterior surface of the device housing; an audio driver disposed within the device housing and aligned to emit sound through the acoustic port; a plurality of recessed regions formed in the housing wall; a plurality of capacitive pixels disposed within the device housing, wherein each capacitive pixel in the plurality of capacitive pixels is disposed within a unique one of the plurality of recessed regions and wherein at least two of the capacitive pixels are disposed radially around the acoustic port and spaced apart from each other by at least 120 degrees; and sensor control circuitry disposed within the internal cavity and operatively coupled to drive the plurality of capacitive pixels at a predetermined frequency to readout a capacitance at each of the plurality of capacitive pixels and determine, based on an algorithm, if the earphone is within an ear of a user.

According to some embodiments, a portable acoustic device is provided that includes: a device housing comprising a speaker housing portion and a stem portion extending away from the speaker housing portion, wherein the speaker housing portion and stem portion combine to define an internal cavity within the device housing; an acoustic port formed through a wall of the speaker housing portion and having an opening at an exterior surface of the device housing; an audio driver disposed within the speaker housing portion and aligned to emit sound through the acoustic port; a plurality of capacitive pixels disposed within the internal cavity, wherein at least two of the capacitive pixels are disposed radially around the acoustic port and spaced apart from each other by at least 90 degrees; and sensor control circuitry disposed within the internal cavity and operatively coupled to drive the plurality of capacitive pixels at a predetermined frequency to readout a capacitance at each of the plurality of capacitive pixels and determine, based on an algorithm, if the earphone is within an ear of a user.

In various implementations, an earphone according to embodiments disclosed herein can further include one or more of the following. The device housing can include a housing wall that defines both an exterior surface of the earphone and an interior surface of the device housing. The earphone can further include a plurality of recessed regions formed in the housing wall, and each capacitive pixel in the plurality of capacitive pixels can be disposed within a unique one of the plurality of recessed regions. Each capacitive pixel can have a thickness of 500 microns or less or can have a thickness of 100 microns or less. Each capacitive sensor can include comprises a stack of layers including: a first conductive layer comprising an active area and a guard ring surrounding and spaced apart from the active area, a conductive shield layer, and a dielectric layer disposed between the first conductive layer and the conductive shield layer. The sensor control circuitry can be further configured to apply a pulsed voltage to the guard ring and the conductive shield layer at the same frequency and time as the capacitive pixels are driven. The sensor control circuitry can be configured to drive the plurality of pixels in accordance with a multi-step process in which the capacitance of each capacitive pixel is measured at one point in time with the guard ring and conductive shield layer grounded and then measured at a second point in time with the guard ring and conductive shield layer pulsed with a signal that mimics the sensing pulse applied to the sensing area. At least two of the capacitive pixels in the plurality of capacitive pixels are disposed radially around the acoustic port and spaced apart from each other by at least 120 degrees. A diameter of the sensing area of each capacitive pixel in the plurality of capacitive pixels can be 4 mm or less. The sensor control circuitry can determine if the earphone is within an ear of a user based on a predetermined in-ear detect algorithm that includes determining whether or not multiple measured capacitance values of the two or more pixels are greater than or less than a predetermined threshold.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF THE INVENTION

Figure 1:
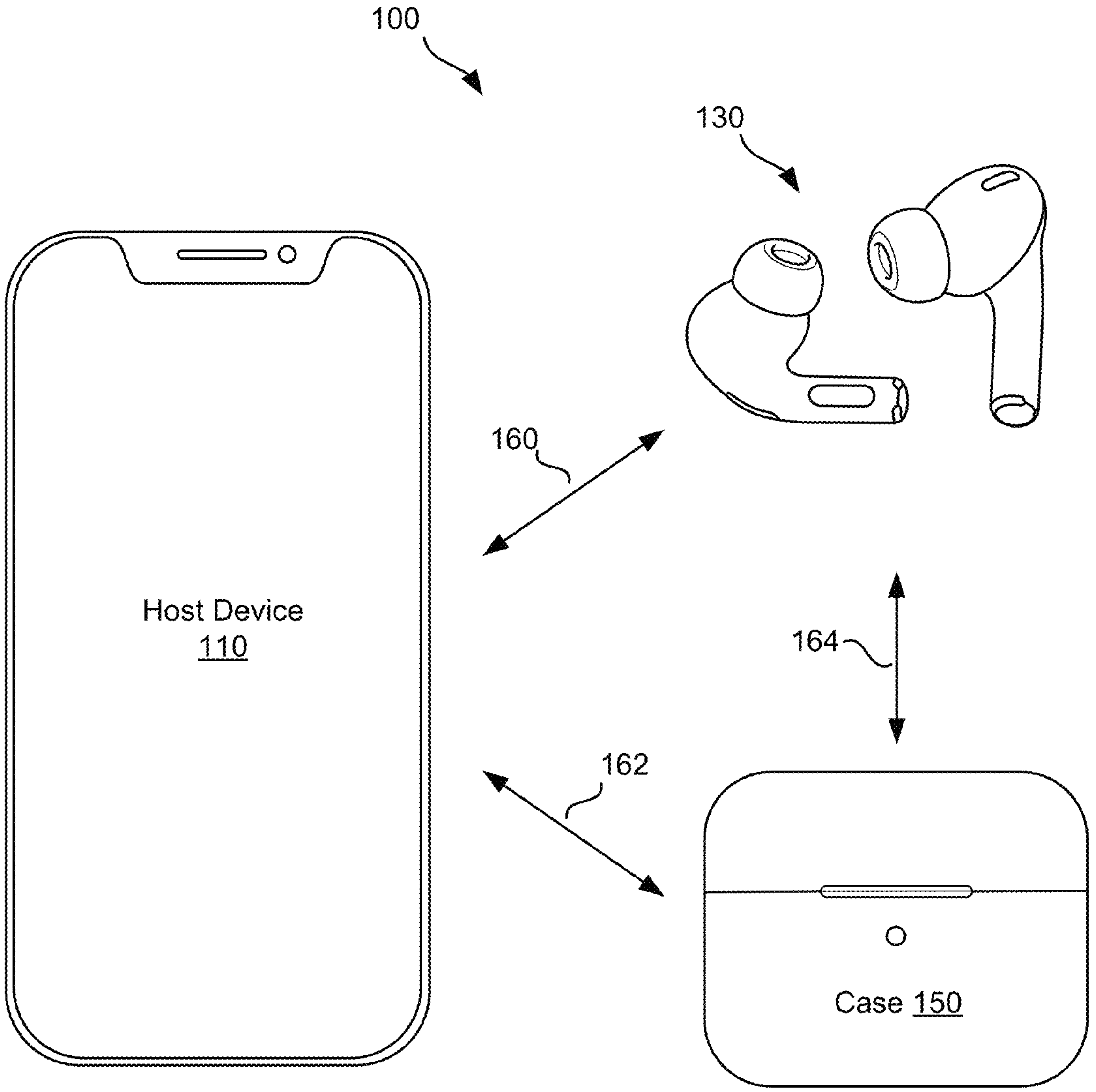
FIG. 1 is a simplified illustration of an exemplary portable electronic listening device system having a host device configured as a smart phone, a case, and a pair of wireless listening devices configured as earphones, according to some embodiments.

Described herein are embodiments of earphones, including wireless earphones, that can enable a user to experience high-end acoustic performance and a pleasant, positive user experience. Some embodiments include multiple capacitive pixels strategically positioned along an exterior surface of a portion of the earphone housing that fits within the ear of a user. The capacitive pixels can be very thin thus taking up minimal space within the earphone housing. The pixels can detect when the earphones are positioned within a user's ear by and provide signals to a controller or other circuitry that can then adjust the operating mode of the earphones accordingly. Thus, for example, when the controller or other circuitry detects that the earphones are not within a user's ear, the controller or other circuity can active a low power mode of the earphones which uses less energy than normal (active) operating modes. In this manner the low power mode saves battery power allowing the earphones to remain operational longer on a single charge and/or be charged less frequently than otherwise might be required.

Definitions

As used herein, the term "portable listening device" includes any portable device configured to be worn by a user and placed such that a speaker of the portable listening device is adjacent to or in a user's ear. A "portable wireless listening device" is a portable listening device that is able to receive and/or send streams of audio data from or to a second device without a wire connecting the portable wireless listening device to the second device using, for example, a wireless communication protocol.

Headphones are one type of portable listening device, headsets (a combination of a headphone and an attached microphone) are another and hearing aids (in-ear devices that are designed to augment sounds from the surrounding environment to improve a user's hearing) are still an additional type of portable listening device. The term "headphones" represents a pair of small, portable listening devices that are designed to be worn on or around a user's head. They convert an electrical signal to a corresponding sound that can be heard by the user. Headphones include traditional headphones that are worn over a user's head and include left and right earcups connected to each other by a headband, and earphones (very small headphones that are designed to be fitted directly in a user's ear). Traditional headphones include both over-ear headphones (sometimes referred to as either circumaural or full-size headphones) that have earpads that fully encompass a user's ears, and on-ear headphones (sometimes referred to as supra-aural headphones) that have earpads that press against a user's ear instead of surrounding the ear.

Earphones, which are a type of headphones, are also portable listening devices. The term "earphones", which can also be referred to as ear-fitting headphones, includes both small headphones, sometimes referred to as "earbuds", that fit within a user's outer ear facing the ear canal without being inserted into the ear canal, and in-ear headphones, sometimes referred to as canal phones, that are inserted in the ear canal itself. The term "earbuds", however, is not used consistently within the industry, and is often used to represent any type headphone that fits within a user's ear. Thus, as used herein, the terms "earbuds" and "earphones" are used interchangeably and can refer to both earphones that are inserted into the ear canal as well as earphones that face the ear canal without being inserted therein.

As used herein, the term "ear tip", which can also be referred to as earmold, includes pre-formed, post-formed, or custom-molded sound-directing structures that at least partially fit within an ear canal. Ear tips can be formed to have a comfortable fit capable of being worn for long periods of time. They can have different sizes and shapes to achieve a better seal with a user's ear canal and/or ear cavity.

In order to better understand and appreciate earphones according to embodiments described herein, a brief description of a use case for such earphones is provided below with respect to FIG. 1.

Example Wireless Listening System

FIG. 1 is an example of a wireless listening system 100 according to some embodiments. System 100 can include a host device 110, a pair of portable wireless listening devices 130 and a charging case 150. Host device 110 is depicted in FIG. 1 as a smart phone but can be any electronic device that can transmit audio data to portable listening device 130. Other, non-limiting examples of suitable host devices 110 include a laptop computer, a desktop computer, a tablet computer, a smart watch, an audio system, a video player, a television, and the like.

As depicted graphically in FIG. 1, host device 110 can be wirelessly communicatively coupled with portable wireless listening devices 130 and charging case 150 through wireless communication links 160 and 162. Similarly, portable wireless listening devices 130 can be communicatively coupled to charging case 150 via wireless communication link 164. Each of the wireless communication links 160, 162 and 164 can be a known and established wireless communication protocol, such as a Bluetooth protocol, a Wi-Fi protocol, or any other acceptable protocol that enables electronic devices to wirelessly communicate with each other. Thus, host device 110 can exchange data directly with portable wireless listening devices 130, such as audio data, that can be transmitted over wireless link 160 to wireless listening devices 130 for play back to a user, and audio data that can be received by host device 110 as recorded/inputted from microphones in the portable wireless listening devices 130. In some implementations, host device 110 can also be wirelessly communicatively coupled with charging case 150 via wireless link 162 so that the host device 110 can exchange data with the charging case, such as data indicating the battery charge level data for case 150, data indicating the battery charge level for portable wireless listening devices 130, data indicating the pairing status of portable wireless listening devices 130.

Portable wireless listening devices 130 can be stored within case 150, which can protect the devices 130 from being lost and/or damaged when they are not in use and can also provide power to recharge the batteries of portable wireless listening devices 130 as discussed below. In some embodiments portable wireless listening devices 130 can also be wirelessly communicatively coupled with charging case 150 via wireless link 164 so that, when the devices are worn by a user, audio data from case 150 can be transmitted to portable wireless listening devices 130. As an example, charging case 150 can be coupled to an audio source different than host device 110 via a physical connection, e.g., an auxiliary cable connection. The audio data from the audio source can be received by charging case 150, which can then wirelessly transmit the data to wireless listening devices 130. That way, a user can hear audio stored on or generated by an audio source by way of wireless listening devices 130 even though the audio source does not have wireless audio output capabilities.

As will be appreciated herein, portable wireless listening devices 130 can include several features can enable the devices to be comfortably worn by a user for extended periods of time and even all day. Each portable listening device 130 can be shaped and sized to fit securely between the tragus and anti-tragus of a user's ear so that the portable listening device is not prone to falling out of the ear even when a user is exercising or otherwise actively moving. Its functionality can also enable wireless listening devices 130 to provide an audio interface to host device 110 so that the user may not need to utilize a graphical interface of host device 110. In other words, wireless listening devices 130 can be sufficiently sophisticated that they can enable the user to perform day-to-day operations from host device 110 solely through interactions with wireless listening devices 130. This can create further independence from host device 110 by not requiring the user to physically interact with, and/or look at the display screen of, host device 110, especially when the functionality of wireless listening devices 130 is combined with the voice control capabilities of host device 110. Thus, wireless listening devices 130 can enable a true hands free experience for the user.

Figure 2:
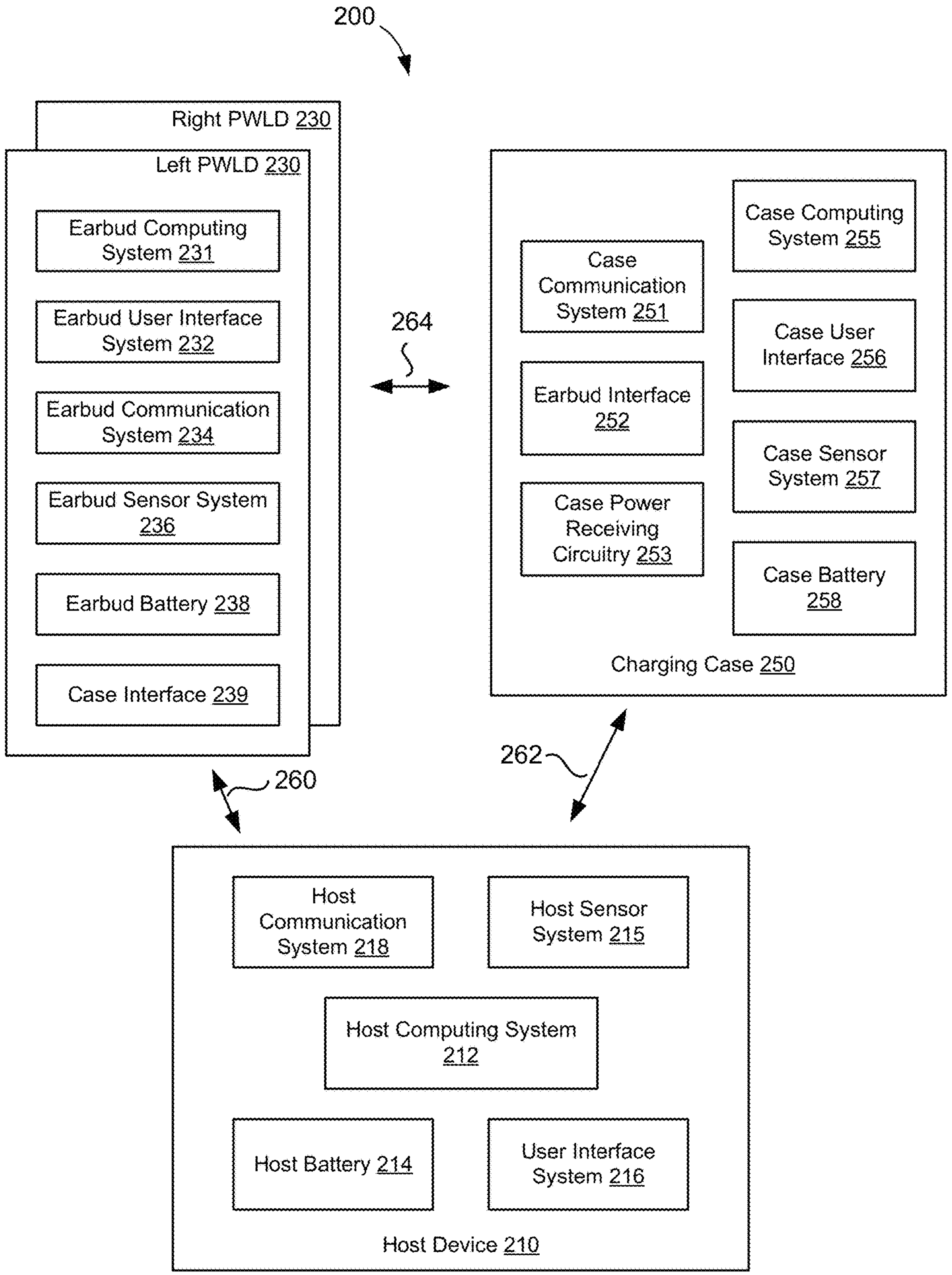
FIG. 2 is a simplified block diagram of various components of a portable wireless listening system according to some embodiments.

Details of an example earphone, which can be representative of each of the portable wireless listening devices 130 are discussed below. First, however, reference is made to FIG. 2, which is a simplified block diagram of various components of a wireless listening system 200 according to some embodiments that includes a host device 210, a pair of portable wireless listening devices (PWLDs) 230 (e.g., a right PWLD 230 and a left PWLD 230) and a charging case 250. System 200 can be representative of system 100 shown in FIG. 1 and host device 210, portable wireless listening devices 230 and charging case 250 can be representative of host device 110, portable wireless listening devices 130 and charging case 150, respectively. Each portable wireless listening device 230 can receive and generate sound to provide an enhanced user interface for host device 210. For convenience, the discussion below refers to a single portable wireless listening device 230, but it is to be understood that, in some embodiments, a pair of portable listening devices can cooperate together for use in a user's left and right ears, respectively, and each portable wireless listening device in the pair can include the same or similar components.

Portable wireless listening device 230 can include a computing system 231 that executes computer-readable instructions stored in a memory bank (not shown) for performing a plurality of functions for portable wireless listening device 230. Computing system 231 can be one or more suitable computing devices, such as microprocessors, computer processing units (CPUs), digital signal processing units (DSPs), field programmable gate arrays (FPGAs), application specific integrated circuits (ASICs) and the like.

Computing system 231 can be operatively coupled to a user interface system 232, communication system 234, and a sensor system 236 for enabling portable wireless listening device 230 to perform one or more functions. For instance, user interface system 232 can include a driver (e.g., speaker) for outputting sound to a user, one or more microphones for inputting sound from the environment or the user, one or more LEDs for providing visual notifications to a user, a pressure sensor or a touch sensor (e.g., a resistive or capacitive touch sensor) for receiving user input, and/or any other suitable input or output device. Communication system 234 can include wireless and wired communication components for enabling portable wireless listening device 230 to send and receive data/commands from host device 210. For example, in some embodiments communication system 234 can include circuitry that enables portable wireless listening device 230 to communicate with host device 210 over wireless link 260 via a Bluetooth or other wireless communication protocol. In some embodiments communication system 234 can also enable portable wireless listening device 230 to wirelessly communicate with charging case 250 via wireless link 264. Sensor system 236 can include proximity sensors (e.g., optical sensors, capacitive sensors, radar, etc.), accelerometers, microphones, and any other type of sensor that can measure a parameter of an external entity and/or environment.

Portable wireless listening device 230 can also include a battery 238, which can be any suitable energy storage device, such as a lithium ion battery, capable of storing energy and discharging stored energy to operate portable wireless listening device 230. The discharged energy can be used to power the electrical components of portable wireless listening device 230. In some embodiments, battery 238 can be a rechargeable battery that enables the battery to be repeatedly charged as needed to replenish its stored energy. For instance, battery 238 can be coupled to battery charging circuitry (not shown) that is operatively coupled to receive power from charging case interface 239. Case interface 239 can, in turn, electrically couple with earphone interface 252 of charging case 250. In some embodiments, power can be received by portable wireless listening device 230 from charging case 250 via electrical contacts within case interface 239. In some embodiments, power can be wirelessly received by portable wireless listening device 230 via a wireless power receiving coil within case interface 239.

Charging case 250 can include a battery 258 that can store and discharge energy to power circuitry within charging case 250 and to recharge the battery 238 of portable wireless power listening device 230. As mentioned above, in some embodiments circuitry within earphone interface 252 can transfer power to portable wireless listening device 230 through a wired electrical connection between contacts in charging case 250 that are electrically coupled to contacts in portable wireless listening device 230 to charge battery 238. While case 250 can be a device that provides power to charge battery 238 through a wired interface with device 230 in some embodiments, in other embodiments case 250 can provide power to charge battery 238 through a wireless power transfer mechanism instead of or in addition to a wired connection. For example, earphone interface can include a wireless power transmitter coil that can couple with a wireless power receiving coil within portable wireless listening device 230.

Charging case 250 can also include a case computing system 255 and a case communication system 251. Case computing system 255 can be one or more processors, ASICS, FPGAs, microprocessors, and the like for operating case 250. Case computing system 255 can be coupled to earphone interface 252 and can control the charging function of case 250 to recharge batteries 238 of the portable wireless listening devices 230, and case computing system 255 can also be coupled to case communication system 251 for operating the interactive functionalities of case 250 with other devices, including portable wireless listening device 230. In some embodiments, case communication system 251 includes a Bluetooth component, or any other suitable wireless communication component, that wirelessly sends and receives data with communication system 234 of portable wireless listening device 230. Towards this end, each of charging case 250 and portable wireless listening device 230 can include an antenna formed of a conductive body to send and receive such signals. Case 250 can also include a user interface 256 that can be is operatively coupled to case computing system 255 to alert a user of various notifications. For example, the user interface can include a speaker that can emit audible noise capable of being heard by a user and/or one or more LEDs or similar lights that can emit a light that can be seen by a user (e.g., to indicate whether the portable listening devices 230 are being charged by case 250 or to indicate whether case battery 258 is low on energy or being charged).

Host device 210, to which portable wireless listening device 230 is an accessory, can be a portable electronic device, such as a smart phone, tablet, or laptop computer. Host device 210 can include a host computing system 212 coupled to a battery 214 and a host memory bank 134 containing lines of code executable by host computing system 212 for operating host device 210. Host device 210 can also include a host sensor system 215, e.g., accelerometer, gyroscope, light sensor, and the like, for allowing host device 210 to sense the environment, and a host user interface system 216, e.g., display, speaker, buttons, touch screen, and the like, for outputting information to and receiving input from a user. Additionally, host device 210 can also include a host communication system 218 for allowing host device 210 to send and/or receive data from the Internet or cell towers via wireless communication, e.g., wireless fidelity (Wi-Fi), long term evolution (LTE), code division multiple access (CDMA), global system for mobiles (GSM), Bluetooth, and the like. In some embodiments, host communication system 218 can also communicate with communication system 234 in portable wireless listening device 230 via a wireless communication link 262 so that host device 210 can send audio data to portable wireless listening device 230 to output sound, and receive data from portable wireless listening device 230 to receive user inputs. The communication link 262 can be any suitable wireless communication line such as Bluetooth connection. By enabling communication between host device 210 and portable wireless listening device 230, wireless listening device 230 can enhance the user interface of host device 210.

Earphones

Figure 3A:
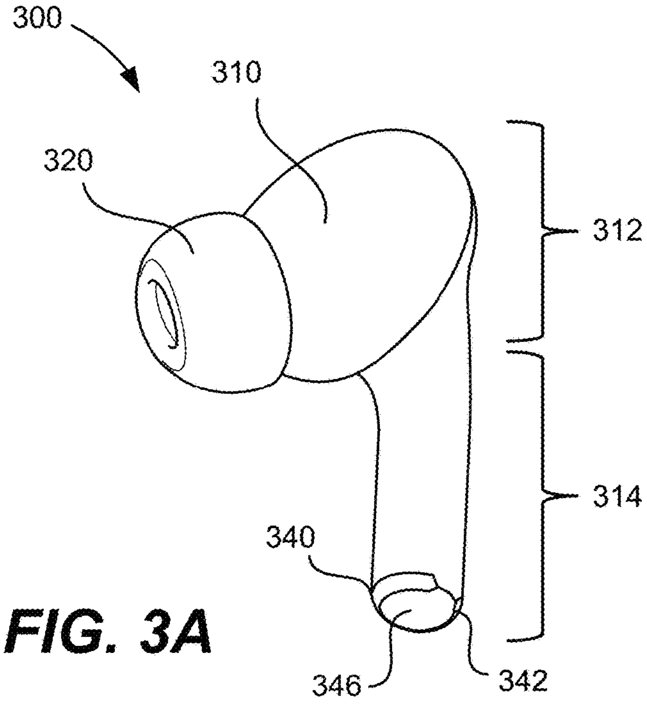
FIGS. 3A-3C are simplified views of a portable wireless earphone according to some embodiments.
Figure 3B:
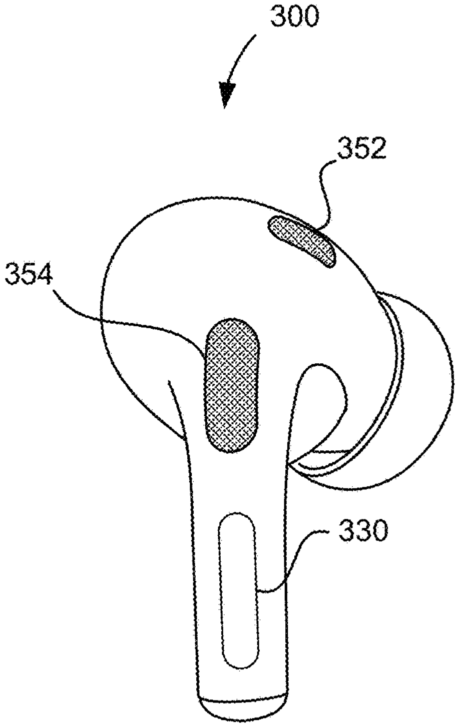
Figure 3C:
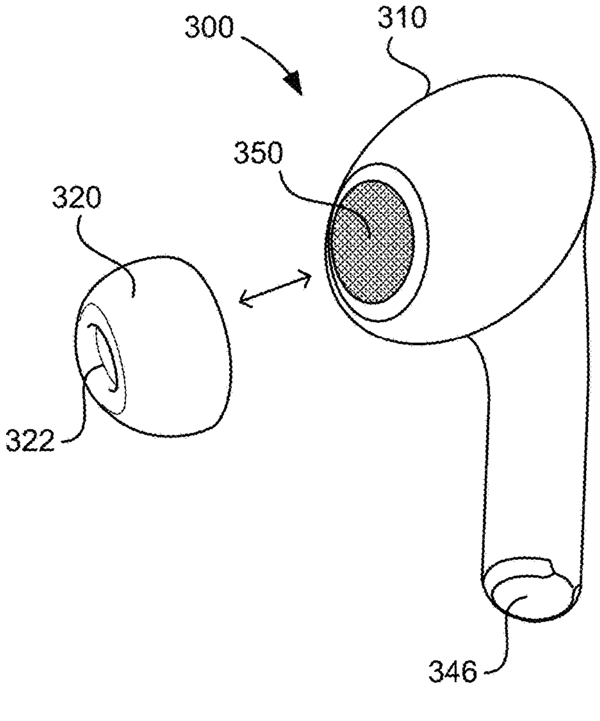

Reference is now made to FIGS. 3A-3C, which are simplified views of a wireless earphone 300 according to some embodiments. Specifically, FIG. 3A illustrates a front perspective view of a wireless earphone according to an embodiment of the disclosure; FIG. 3B illustrates a rear perspective view of the wireless earphone shown in FIG. 3A; and FIG. 3C illustrates a front perspective view of the wireless earphone shown in FIG. 3A with its ear tip removed. Those skilled in the art will readily appreciate that the description of earphone 300 in FIGS. 3A-3C is provided for illustrative purposes only and that, as discussed above, while earphone 300 is an in-ear headphone that represents a specific example of a portable listening device according to some embodiments, embodiments of the invention are not limited to in-ear headphones or to the specific features of earphone 300 as discussed below.

Earphone 300 can include a housing 310 and an ear tip 320 that can direct sound from an internal audio driver (e.g., a speaker) out of housing 310 and into a user's ear canal. Housing 310 can be made from, for example, a hard radio frequency (RF) transparent plastic such as acrylonitrile butadiene styrene (ABS) or polycarbonate. In some embodiments, housing 310 can be made from one or more components that can be bonded together (e.g., with tongue and groove joints and an appropriate adhesive) to form a monolithic housing structure with a substantially seamless appearance.

Stem 314 can be substantially cylindrical in construction, but it can include a planar region 330 that does not follow the curvature of the cylindrical construction. Planar region 330 can indicate an area where the wireless listening device is capable of receiving user input. For instance, a user input can be inputted by squeezing stem 314 at planar region 330 or sliding a finger along a portion of the planar region. Stem 314 can also include electrical contacts 340 and 342 for making contact with corresponding electrical contacts in charging case that can store and charge a pair of earphones 300. Electrical contacts 340, 342 provide a physical interface that can be electrically coupled with corresponding electrical contacts in a corresponding charging case (e.g., charging case 150). It is to be understood that embodiments are not limited to the particular shape and format of the housing 310 depicted in FIGS. 3A-3C. For example, in some embodiments the housing does not include a stem or similar structure and in some embodiments an anchor or other structure can be attached to or extend away from the housing to further secure the earphone to a feature of the user's ear.

Also shown in FIG. 3A is a cap 346 that is part of overall housing 310 and can be affixed to an end of stem 314 forming a water tight seal with the stem. A bottom microphone (not shown) can be attached to an interior surface of cap 346 and the cap can include an acoustic port (not shown) that allows the microphone to capture sounds from the environment. Cap 346 can also include two seats along its external surface on opposite sides of the cap for the two contacts 340, 342. The two seats can be recessed a sufficient amount such that the contacts 340, 342 can be secured to the seats and positioned flush with an outer surface of cap 346 creating a smooth, seamless structure that has an improved appearance and reliability. An electrical connection to circuitry within stem 314 can be made to each of contacts 340, 342 through an appropriate cutout or opening in cap 346 that can be covered by the contacts.

In some embodiments housing 310 can be formed of a seemingly monolithic outer structure without any obvious seams or rough edges. Housing 310 can form a shell that defines an interior cavity (not shown) in which the various components of earphone 300 are positioned. For example, enclosed within housing 310 can be a processor or other type of controller, one or more computer-readable memories, wireless communication circuitry, an antenna, a rechargeable battery and power receiving circuitry. Housing 310 can also house an audio driver (i.e., a speaker) and one or more microphones. The speaker and one or more microphones can each be positioned within housing 310 at locations adjacent to audio openings that extend through housing 310 to allow the speaker and the one or more microphones to transmit and receive audio waves through the housing. Various sensors, such as an accelerometer, a photodetector, force and touch sensors, including capacitive pixels according to embodiments disclosed herein, can also be disposed within housing 310. As all of the various components described above are disposed within the housing 310, none of the described components are shown in any of FIGS. 3A-3C.

Some or all of such audio openings can be covered by a mesh. For example, as shown in FIG. 3C, a mesh 350 can be disposed over an audio port formed in speaker housing 312. A speaker can be positioned within the speaker housing and aligned to emit sound through the audio port, through mesh 350 and through a central channel 322 that extends through ear tip 320 into a user's ear canal. As another example, a rear vent (not shown in the figures) can be formed through speaker housing 312 and covered with a mesh 352. The rear vent can be acoustically coupled to a back volume of the speaker housing to provide improved acoustic performance of the earphone. As still another example, a microphone port (also not shown in the figures) can formed through housing 310 at a location near where speaker housing 312 and stem 314 are joined and covered by a mesh 354. A microphone can be disposed within housing 310 at a location adjacent to the microphone port such that the microphone can receive sound waves through mesh 354 and through the microphone port.

Ear tip 320 can be made primarily from a deformable material and can be sized and shaped to fit within a user's ear canal. As such, the ear tip 320 and speaker housing 312 can combine to be the primary support mechanism that secures earphone 300 within the ear of a user. In the embodiment depicted in FIGS. 3A-3C, ear tip can be removably attached to speaker housing 312 and is shown in FIG. 3A in an attached state and in FIG. 3C in a detached stated. Earphones according to other embodiments need not include a deformable ear tip and can instead rely on the earphone housing (e.g., speaker housing 312) to be the primary support mechanism for earphone 300 when the earphone is positioned within the ear of a user.

In-Ear Detect

Earphone 300 can include multiple capacitive pixels that can be used to determine when the earphone is being worn within a user's ear. Each capacitive pixel can be a touch sensor that measures an amount of capacitance at the sensor. When positioned near human skin, capacitance at the pixel sensor increases thus enabling the multiple pixel sensors to be monitored by circuitry to make a determination as to whether or not the earphone is within the ear of a user.

Figure 4:
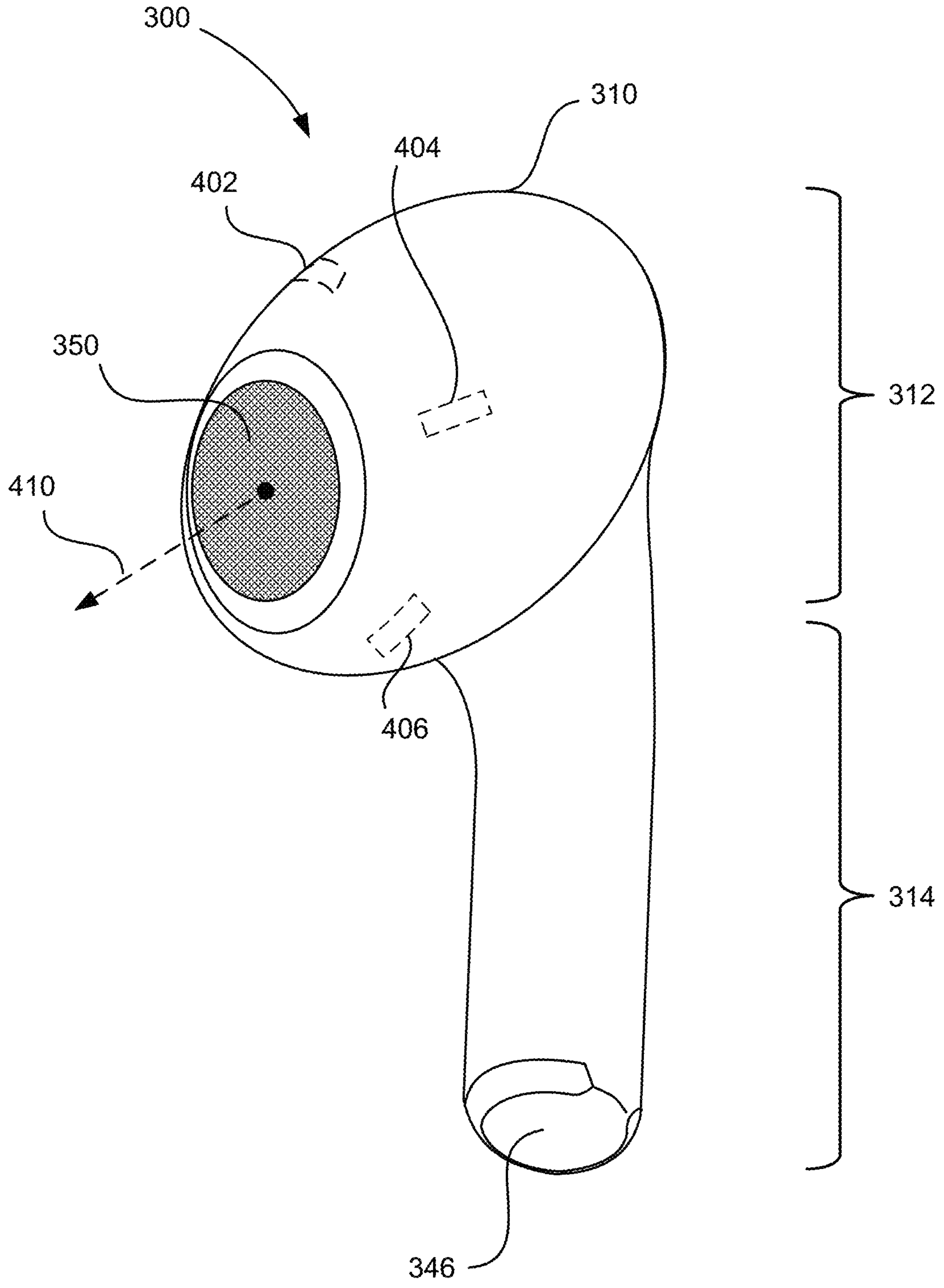
FIG. 4 is a simplified front perspective illustration of the earphone depicted in FIGS. 3A-3C without its ear tip.

Referring to FIG. 4, which is a simplified, enlarged front perspective illustration of earphone 300 described with respect to FIGS. 3A-3C, in some embodiments earphone 300 can include three capacitive pixels 402, 404, 406 that are strategically positioned along housing 310 (directly underneath the exterior surface) at locations in which the pixels are likely to be in physical contact with, or be in very close proximity to, the surface (i.e., the skin) of a user's ear when earphone 300 is worn by a user.

As shown in FIG. 4, the depicted embodiment includes three separate capacitive pixels (often referred to herein as just "pixels" for short). When viewed from a point of view looking straight into acoustic port 350 (along axis 410), two of the pixels are radially spaced apart from each other by at least 90 degrees. Spacing two pixels at least 90 degrees apart (and at least 120 degrees apart in some embodiments) helps to ensure that the pixels detect skin contact independent of each other thereby reducing false positive readings in which the pixels indicate that the earphone is within the ear of a user when instead it is in contact with a finger, palm or something else altogether that can cause capacitance measurements of one of the pixels to increase above a detection threshold without causing a similar increase in capacitance at the other pixel. Including a third pixel further reduces false positives. Embodiments are not limited to any particular number of capacitive pixels or any particular location of the pixels. As a person of ordinary skill will appreciate, the locations of the pixels can be dependent on the size and shape of the earphone housing as well as on the number of pixels incorporated into the housing and the size and shape of each pixel. In some embodiments the locations can be determined based on a heat map developed from fit tests from dozens or hundreds or more users that indicate locations along the housing that come into physical contact with each user's ear.

Each capacitive pixel can be disposed within the cavity formed by housing 310 in a position that is in close proximity to the exterior surface of the housing. The capacitive pixels can be very thin (for example, 500 microns or less in some embodiments; or 100 microns or less in some embodiments) and fit within dedicated recessed slots or cutouts formed in an inside surface of housing 310, such that the pixels are spaced apart from the exterior surface by only the thickness of the thinned housing in the areas at which each slot is formed.

Figure 5A:
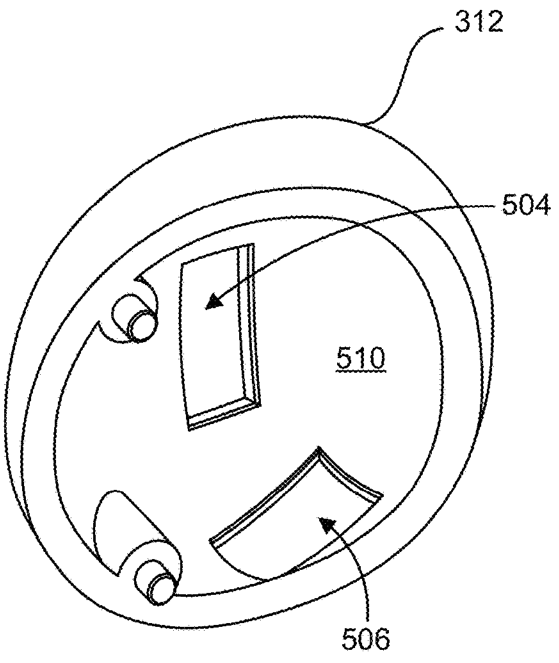
FIGS. 5A and 5B are simplified cut-away views of a portion of an earbud housing according to some embodiments.
Figure 5B:
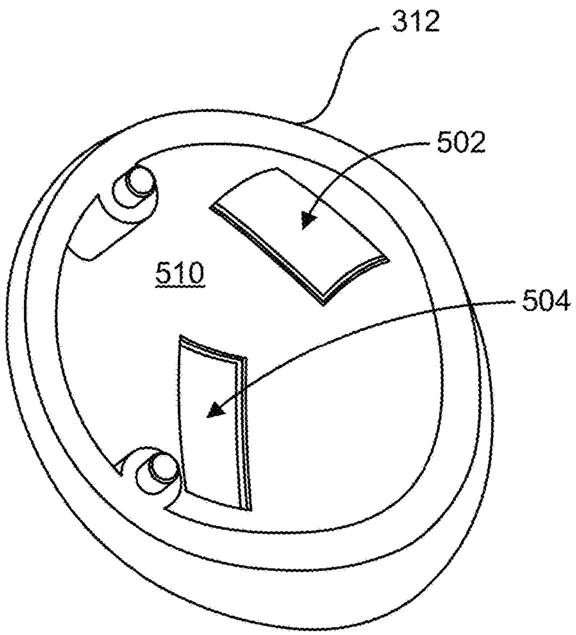

To illustrate, reference is made to FIGS. 5A and 5B, each of which is a simplified cut-away view of a portion of earbud housing 310 according to some embodiments taken from two different angles. As shown in FIGS. 5A and 5B, thin cutouts or slots 502, 504, 506 can be formed in the housing wall to accommodate the capacitive pixels 402, 404, 406, respectively. Each slot 502, 504, 506 can have depth that allows its respective thin capacitive pixel to be fully recessed within the slot without any portion of the capacitive pixel protruding in a proud manner. A flex circuit (not shown) can extend along an inner surface 510 of housing 310 and electrically couple the capacitive pixels to circuitry that routes signals between the pixels and a sensor control circuit, such as an ASIC or similar controller or appropriate circuitry. The sensor control circuit can drive and monitor each of the capacitive pixels 402, 404, 406 by, for example, sending a control signal to each pixel to read the capacitance at the pixels at one or more predetermined frequencies (e.g., at frequencies between 0.5 to 1000 Hz). In some embodiments, the sensor control circuit sends separate control signals, spaced apart in time, to each capacitive pixel at the same frequency such that the three pixels 402, 404, 406 are repeatedly read out sequentially.

The sensor control circuitry can be part of or can communicate with a controller or other processor within earphone 300, such as earphone computing system 231, to implement different modes of operation for earbud 300 that enable the earbud to conserve battery power. For example, when the capacitive pixels indicate that earphone 300 is not positioned within a user's ear, the controller can place earbud 300 in a low power or sleep mode to conserve battery power. The sensor circuitry can execute a predetermined algorithm, an artificial intelligence engine or other techniques to determine when the measurements taken from the capacitive pixels indicate the earphone is within a user's ear or not as discussed further below. For the sake of convenience and reference, the various techniques and methods relied upon by the sensor circuitry to make the in-ear or out-of-ear determination, can be referred to herein collectively as "in-ear detect" algorithms.

Example Pixel

Figure 6A:
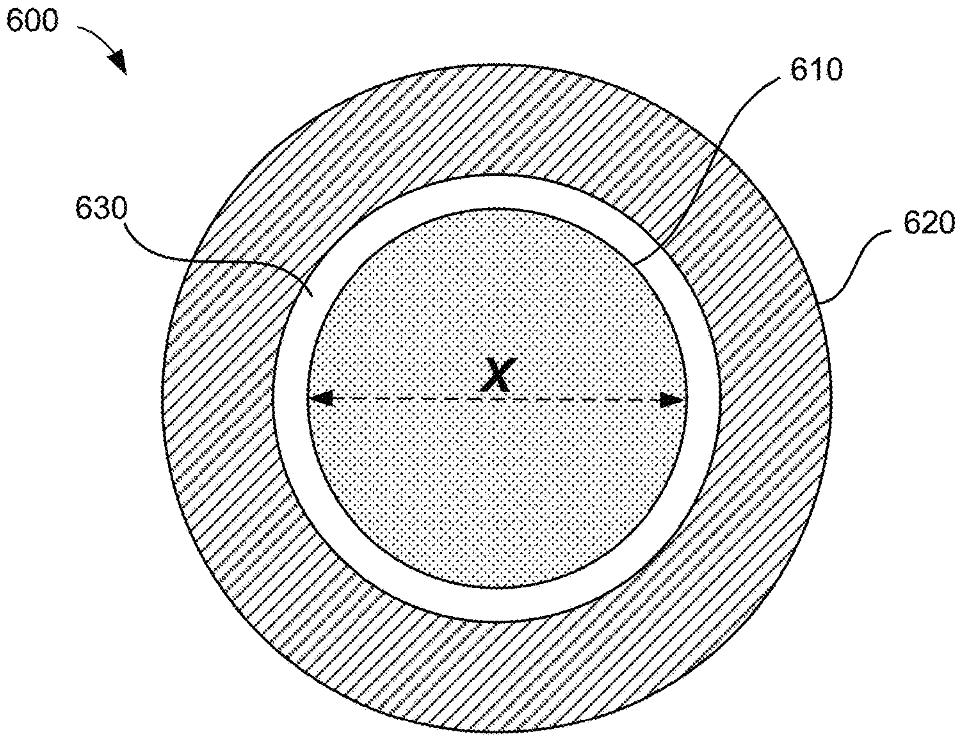
FIG. 6A is simplified top plan illustration of a capacitive pixel according to some embodiments.
Figure 6B:
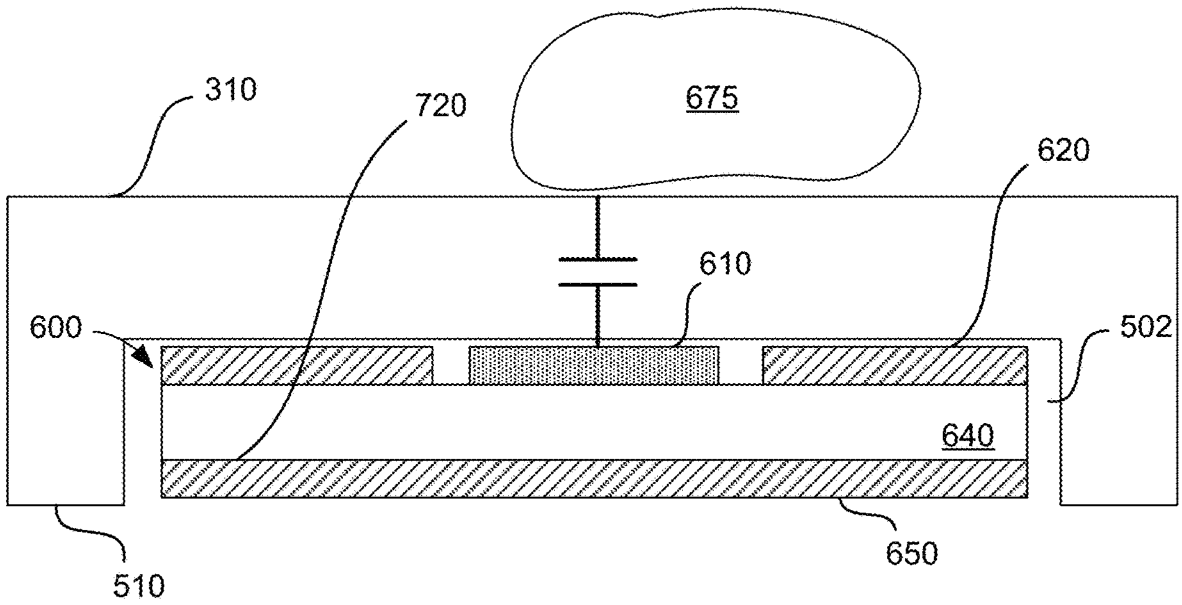
FIG. 6B is a simplified cross-sectional view of the capacitive pixel shown in FIG. 6A positioned within a slot formed in an earphone housing according to some embodiments.

An example of a pixel 600 according to some embodiments is shown in FIGS. 6A and 6B in which FIG. 6A is simplified top plan illustration of pixel 600 and FIG. 6B is a simplified cross-sectional view of pixel 600. As shown, pixel 600 can include a sensing area 610 (i.e., an electrode) surrounded by a guard ring 620 that is spaced apart from sensing area 610 by a gap 630. In some implementations, gap 630 can be an air or can be filled in with a dielectric material. Each of the sensing area 610 and guard ring 620 can be a thin, electrically conductive material, such as copper, indium tin oxide (ITO) or a similar electrically conductive metal.

Reference is now made to FIG. 6B, which depicts pixel 600 within a slot formed in housing 310, which is labeled slot 502 but is representative of slots 504 and 506 as well. As shown in FIG. 6B, a dielectric layer 640 is disposed between sensing area 610 and a ground layer 650 such that the sensing area 610, dielectric layer 640 and ground layer 650 form a vertical stack of layers. Sensing area 610, guard ring 620 and ground layer 650 can all be electrically conductive layers made from an appropriate metal or similar material. Ground layer 650 can be coupled to ground and can completely cover the backside of pixel 600 to protect sensing area 610 from noise. In some embodiments, dielectric layer 640 can be a stack of two or more layers, such as a polymide layer and a protective or coverlay dielectric layer disposed between the polymide layer and the ground shield. While not shown, the various layers can be bonded to each other by one or more adhesive layers.

In the depicted embodiment, sensing area 610 has a circular shape with a diameter of X, and gap 630 is a ring that is concentric with sending area 610. In some embodiments, X is less than 4 mm, is between 1-3 mm, or is approximately 2 mm. As a person of skill would appreciate, however, embodiments are not limited to any particular size or shape of the sensing area, the guard ring or the gap separating the two. Additionally, it is to be understood that embodiments disclosed herein are not limited to the particular capacitive pixel 600 shown in FIGS. 6A and 6B. Instead, a number of different types of, and configurations of, capacitive pixels can be employed instead of or in addition to pixels 600.

In operation, in some embodiments guard ring 620 and ground layer 650 can be coupled to ground and sensing area 610, which is coupled to a driver circuit (not shown) can be periodically pulsed to measure the parasitic capacitance at sensing area 610 (electrode) in the system. Measurements from each of the capacitive pixels in the earphone (e.g., pixels 402, 404 and 406 in the embodiment depicted in FIG. 4) can then be collected in this manner and sent to sensor control circuitry that can make a determination, based on an in-ear detect algorithm, if the collected measurements indicate the earphone is likely positioned within a user's ear or not.

A person of skill in the art will appreciate that a variety of different in-ear detect algorithms can employed in making such a determination. As one example, the algorithm can determine whether or not the earphone is within a user's ear based on whether or not the multiple measured values of two or more of the pixels are greater than or less than a predetermined threshold. In other embodiments, the algorithm can conclude that an individual pixel is in contact with the skin of a user (and thus possibly positioned within the user's ear) when the measured capacitance, C, is above a predetermined level (e.g., above the make value 710 indicated in the graph of FIG. 7), the algorithm can conclude that an individual pixel is not in contact with or directly adjacent to skin 675 of a user (and thus unlikely within the user's ear) when the measured capacitance is below a predetermined level (e.g., below the break value 720 indicated in the graph of FIG. 7), and if the measured capacitance is between the make and break values, the algorithm can flag the pixel for being inconclusive as to whether or not it is in contact with human skin (and thus inconclusive as to whether or not the pixel is within the user's ear). The algorithm can then make a determination as to whether or not the earphone is likely positioned within the ear of a user based on the measurements of each of the pixels.

Figure 7:
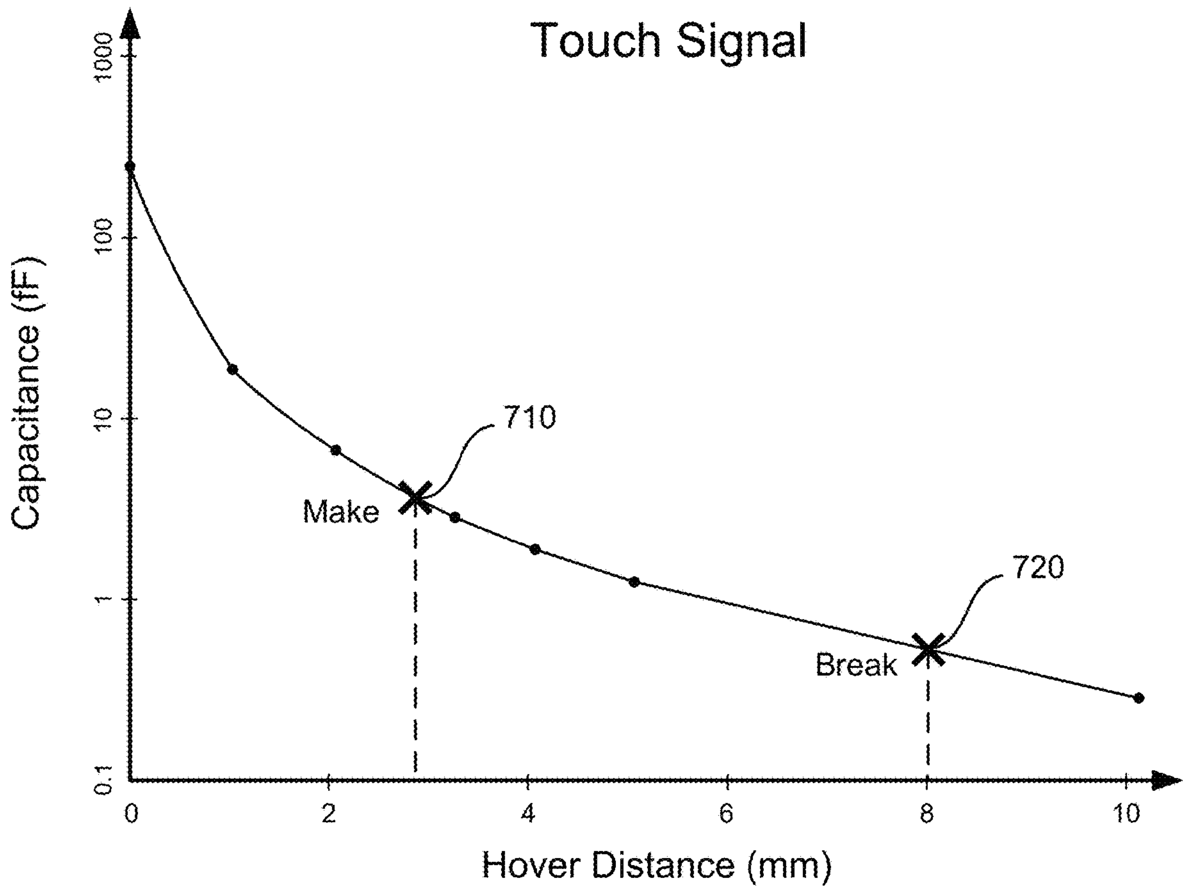
FIG. 7 is a graph illustrating make and break points of a capacitive pixel according to a particular embodiment.

As one illustrative but non-limiting example, if capacitance measurements of pixels 402 and 404 are above make point 710, the algorithm might conclude that the earphone is within an ear as long as the measured capacitance of pixel 406 is not below break point 720. As another illustrative but non-limiting example, if capacitance measurements of pixel 402 is above make point 710 but measurements of at least one of pixels 404 and 406 is are below the break point, the algorithm might conclude that the earphone is not within an ear regardless of the measured capacitance of the other of pixel 404 or 406. As still one more illustrative but non-limiting example, if capacitance measurements of pixel 402 is above make point 710 and the capacitive measurements of both pixels 404 and 406 are in between the make and break points 710, 720, the algorithm might conclude that the earphone is within a user's ear. A skilled artisan will be able to program the control circuitry with an appropriate algorithm based on measurements taken during testing processes. In still other embodiments, the algorithm can be an artificial intelligence engine trained to identify capacitance measurements from the pixels that indicate whether or not an earphone is within the ear of user. Additionally, the skilled artisan will appreciate that the specific make and break thresholds set forth in FIG. 7 are for illustrative purposes only. Capacitance levels different than the specific make and break levels shown in FIG. 7 can be used in other embodiments and can be determined using various known testing processes and techniques.

Mitigation of Thermal Drift

Capacitance measurements can vary over time due to changes in temperature when the measurements are taken. For example, when earphone 300 is placed within the ear of a user, the temperature of the earphone can sometimes be increased due to the transfer of body heat from the user to the earphone. The change in temperature can impact the capacitance measured by the capacitive pixel, which in turn, can adversely impact conclusions that the in-ear detect algorithm makes from capacitance measurements.

Figure 8A:
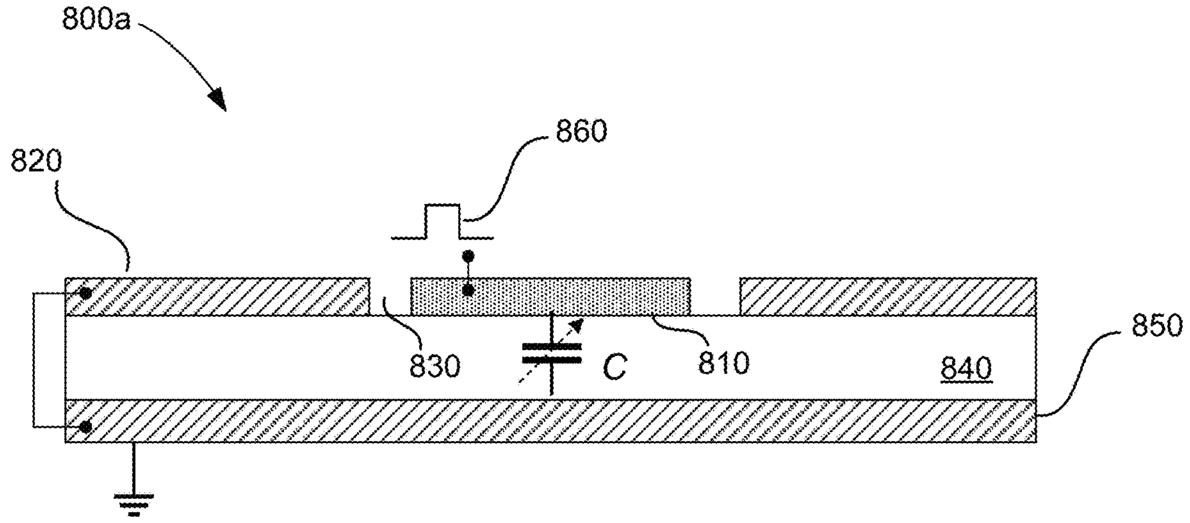
FIGS. 8A and 8B are simplified cross-sectional view schematic illustrations of capacitive pixels according to some embodiments.
Figure 8B:
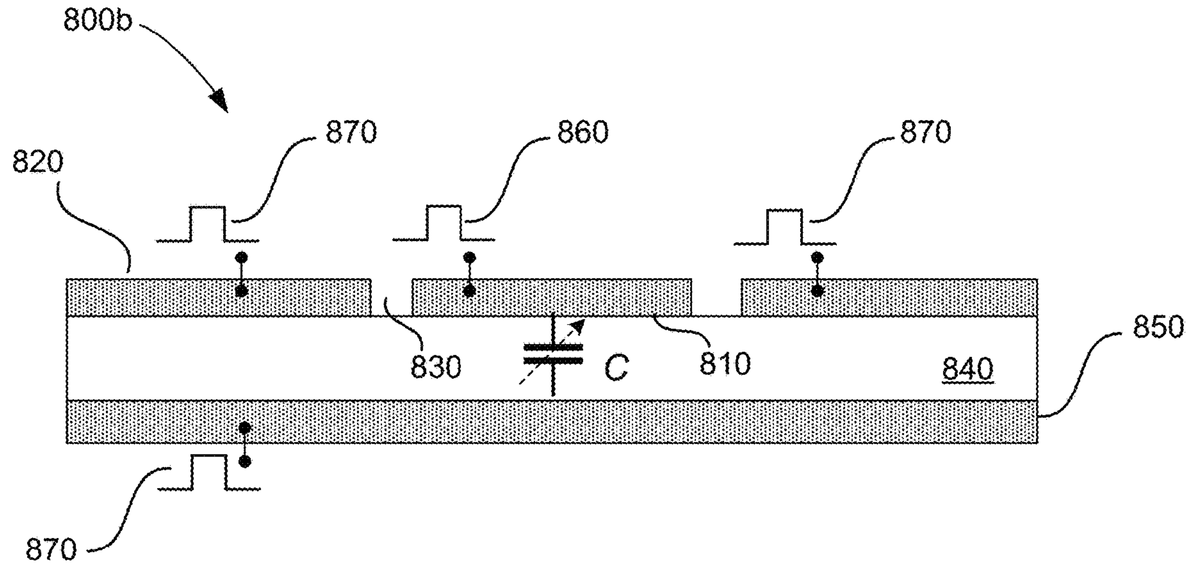

To mitigate the potential impact of such temperature changes (i.e., thermal drift), some embodiments include an AC shield around the sensing area of each pixel as described below in conjunction with FIGS. 8A and 8B, which are a simplified cross-sectional view schematic illustration of two capacitive pixels 800*a* and 800*b* according to some embodiments. Pixel sensors 800*a*, 800*b* can be similar to pixel 600 discussed above and include a sensing area 810, a guard ring 820 separated from the sensing area by a gap 830. Pixel 800 can also include a conductive plane 850 separated from the sensing area and guard ring by a dielectric layer 840. Each of these primary elements, sensing area 810, guard ring 820, gap 830, dielectric layer 840 and ground layer 850 can be physically similar to the elements with the same name (or similar reference number) discussed above with respect to FIGS. 6A and 6B. Additionally, in capacitive pixel 800*a*, guard ring 820 and conductive plane 850 can be directly coupled to ground.

Pixel 800*b* is different. Unlike the guard ring 620 and ground plane 650 in pixel 600, guard ring 820 and conductive plane 850 are not directly coupled to ground. Instead, these electrically conductive structures can be electrically coupled to receive a signal 870 that mimics the sensing pulse 860 applied to sensing area 850. In this manner, each time pulse 860 initiates the measurement of capacitance at sensing area 850 (i.e., samples the capacitance at sensing area 850), pulse 870 is applied to the guard ring 820 and to the AC plane 850 so that the baseline signals for each of elements move together modulating out any thermal drift in the signal. At the same time, conductive plane 850 acts as an AC shield shielding sensing area 850 from outside noise.

Mitigation of Humidity

Figure 9A:
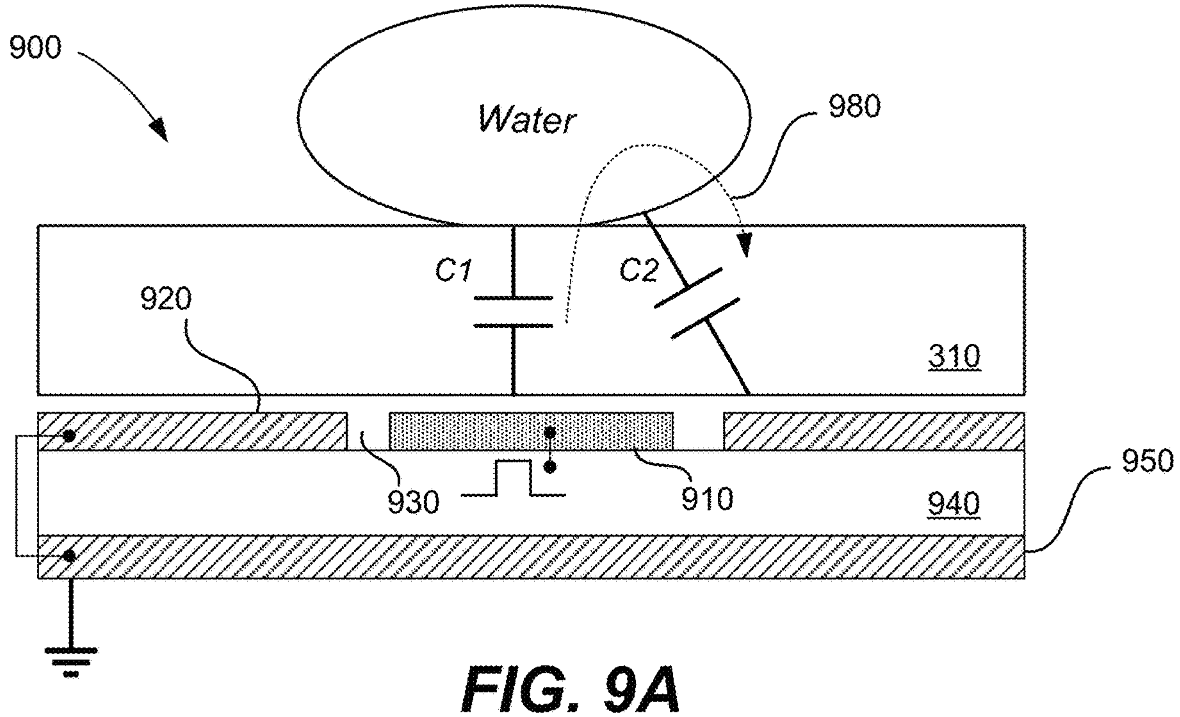
FIGS. 9A and 9B are simplified cross-sectional view schematic illustrations of a capacitive pixel according to some embodiments.

Reference is now made to FIG. 9A, which his a simplified cross-section and schematic view of a pixel 900 according to some embodiments. Pixel 900 can be similar in construction to pixels 600 and 800 and is thus not discussed further in detail except to note operational differences between pixel 900 and the earlier described pixels. Thus, pixel sensor 900 can include a sensing area 910, a guard ring 920 separated from the sensing area by a gap 930. Pixel 900 can also include a conductive plane 950 separated from the sensing area and guard ring by a dielectric layer 940. Each of these primary elements, sensing area 910, guard ring 920, gap 930, dielectric layer 940 and conductive plane 950 can be physically similar to the elements with the same name (or similar reference number) discussed above with respect to FIGS. 6A, 6B and 8A, 8B.

When an earphone is exposed to moisture, such as water droplets, capacitance readings from pixels can show capacitance between both the water and the sensing area of a pixel (indicated in FIG. 9A as capacitance, C1) as well as capacitance between the water droplet and the guard ring (indicated in FIG. 9A as capacitance, C2) and a leakage current 980 can be created through the water droplet between sensing area 910 and the grounded guard ring 920. Thus, water droplets or other moisture on the earphone can mimic skin contact and can potentially cause inaccurate in-ear detect readings.

Figure 9B:
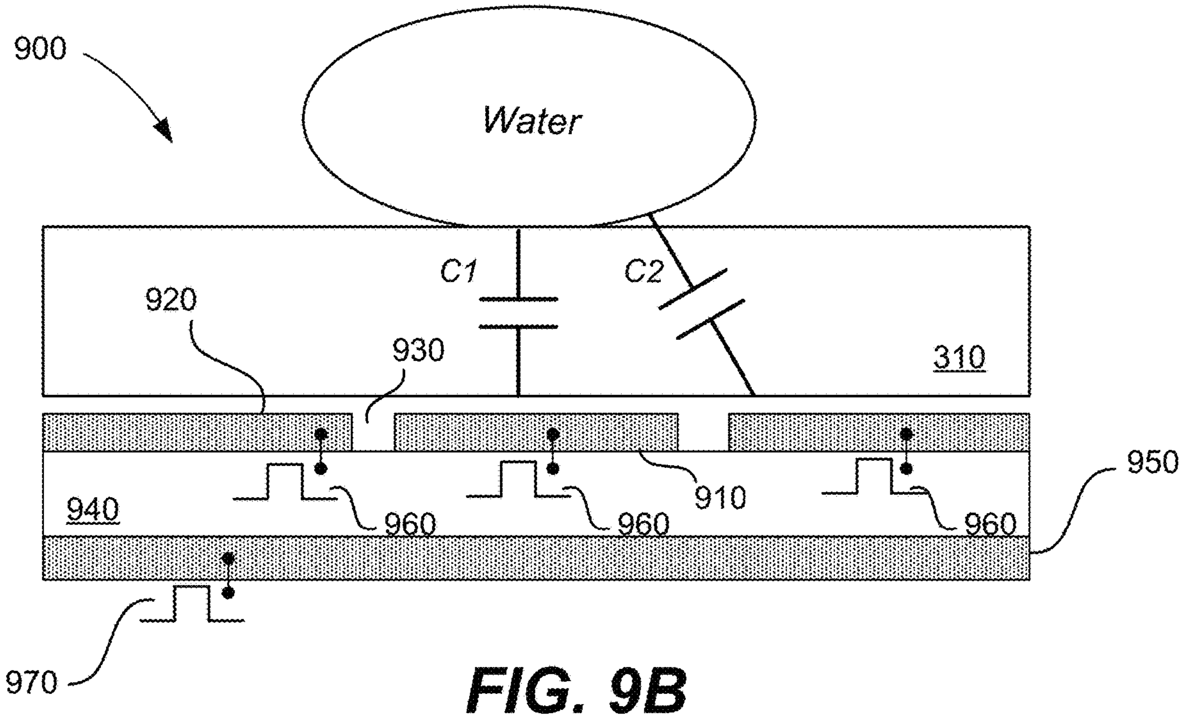

In order to distinguish water droplets or other moisture that might be in contact with a pixel, some embodiments electrically couple guard ring 920 and conductive shield 950 to receive a signal 970 that mimics the sensing pulse 960 applied to sensing area 950. These embodiments can then employ a multi-step sampling process in which the capacitance at sensing area 910 is sampled at one point in time with the guard ring 920 and conductive shield 950 grounded (e.g., as shown in FIG. 9A) and then sampled at a second point in time (e.g., milliseconds later) with guard ring 920 and conductive shield 950 pulsed with signal 970 (e.g., as shown in FIG. 9B), which mimics the sensing pulse 960 applied to sensing area 950. In this manner, each time pulse 960 initiates the measurement of capacitance at sensing area 950 (i.e., samples the capacitance at sensing area 950), pulse 970 is applied to the guard ring 920 and to the conductive plane 950 eliminating or greatly reducing the potential leakage current 980 shown in FIG. 9A. The difference between the two signals can then be used in identifying the leakage current and determining that moisture is impacting the sensor readings rather than skin contact.

Additional Embodiments

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. Also, while different embodiments of the invention were disclosed above, the specific details of particular embodiments may be combined in any suitable manner without departing from the spirit and scope of embodiments of the invention. Further, it will be apparent to one of ordinary skill in the art that many modifications and variations are possible in view of the above teachings.

Finally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An earphone comprising:

a device housing that defines an internal cavity within the device housing;

an acoustic port formed through the device housing and having an opening at an exterior surface of the device housing;

an audio driver disposed within the device housing and aligned to emit sound through the acoustic port;

a plurality of capacitive pixels disposed within the internal cavity, wherein each capacitive pixel comprises a stack of layers including: a first conductive layer comprising an active area and a guard ring surrounding and spaced apart from the active area, a conductive shield layer, and a dielectric layer disposed between the first conductive layer and the conductive shield layer; and sensor control circuitry disposed within the internal cavity and operatively coupled to drive the plurality of capacitive pixels at a predetermined frequency to readout a capacitance at each of the plurality of capacitive pixels and determine if the earphone is within an ear of a user, wherein the sensor control circuitry is configured to apply a pulsed voltage to the guard ring and the conductive shield layer at a same frequency and time as the plurality of capacitive pixels are driven.

2. The earphone set forth in claim 1 wherein:

the device housing includes a housing wall that defines both an exterior surface of the earphone and an interior surface of the device housing;

the earphone further comprises a plurality of recessed regions formed in the housing wall; and each capacitive pixel in the plurality of capacitive pixels is disposed within a unique one of the plurality of recessed regions.

3. The earphone set forth in claim 2 wherein each capacitive pixel has a thickness of 500 microns or less.

4. The earphone set forth in claim 1 wherein at least two of the capacitive pixels in the plurality of capacitive pixels are disposed radially around the acoustic port and spaced apart from each other by at least 120 degrees.

5. The earphone set forth in claim 1 wherein a diameter of a sensing area of each capacitive pixel in the plurality of capacitive pixels is 4 mm or less.

6. The earphone set forth in claim 1 wherein the sensor control circuitry determines if the earphone is within an ear of a user based on a predetermined in-ear detect algorithm that includes determining whether or not multiple measured capacitance values of the two or more pixels are greater than or less than a predetermined threshold.

7. The earphone set forth in claim 1 wherein the sensor control circuitry determines if the earphone is within an ear of a user based an artificial intelligence engine.

8. An earphone comprising:

a device housing that defines an internal cavity within the device housing;

an acoustic port formed through the device housing and having an opening at an exterior surface of the device housing;

an audio driver disposed within the device housing and aligned to emit sound through the acoustic port;

a plurality of capacitive pixels disposed within the internal cavity, wherein each capacitive pixel comprises a stack of layers including: a first conductive layer comprising an active area and a guard ring surrounding and spaced apart from the active area, a conductive shield layer, and a dielectric layer disposed between the first conductive layer and the conductive shield layer; and sensor control circuitry disposed within the internal cavity and operatively coupled to drive the plurality of capacitive pixels at a predetermined frequency to readout a capacitance at each of the plurality of capacitive pixels and determine if the earphone is within an ear of a user;

wherein the sensor control circuitry is configured to drive the plurality of pixels in accordance with a multi-step process in which the capacitance of each capacitive pixel is measured at one point in time with the guard ring and conductive shield layer grounded and then measured at a second point in time with the guard ring and conductive shield layer pulsed with a signal that mimics a sensing pulse applied to a sensing area of each capacitive pixel.

9. An earphone comprising:

a device housing that includes a housing wall that defines both an exterior surface of the earphone and an interior surface of the device housing;

an acoustic port formed through the device housing and having an opening at an exterior surface of the device housing;

an audio driver disposed within the device housing and aligned to emit sound through the acoustic port;

a plurality of recessed regions formed in the housing wall;

a plurality of capacitive pixels disposed within the device housing, wherein each capacitive pixel in the plurality of capacitive pixels is disposed within a unique one of the plurality of recessed regions and comprises a stack of layers including: a first conductive layer comprising an active area and a guard ring surrounding and spaced apart from the active area, a conductive shield layer, and a dielectric layer disposed between the first conductive layer and the conductive shield layer; and sensor control circuitry disposed within the device housing and operatively coupled to drive the plurality of capacitive pixels at a predetermined frequency to readout a capacitance at each of the plurality of capacitive pixels and determine, based on an algorithm, if the earphone is within an ear of a user, and wherein the sensor control circuitry is configured to apply a pulsed voltage to the guard ring and the conductive shield layer at a same frequency and time as the plurality of capacitive pixels are driven.

10. An earphone comprising:

a device housing that includes a housing wall that defines both an exterior surface of the earphone and an interior surface of the device housing;

an acoustic port formed through the device housing and having an opening at an exterior surface of the device housing;

an audio driver disposed within the device housing and aligned to emit sound through the acoustic port;

a plurality of recessed regions formed in the housing wall;

a plurality of capacitive pixels disposed within the device housing, wherein each capacitive pixel in the plurality of capacitive pixels is disposed within a unique one of the plurality of recessed regions and wherein each capacitive pixel comprises a stack of layers including: a first conductive layer comprising an active area and a guard ring surrounding and spaced apart from the active area; a conductive shield layer; and a dielectric layer disposed between the first conductive layer and the conductive shield layer; and sensor control circuitry disposed within the device housing and operatively coupled to drive the plurality of capacitive pixels at a predetermined frequency to readout a capacitance at each of the plurality of capacitive pixels and determine, based on an algorithm, if the earphone is within an ear of a user;

wherein the sensor control circuitry is configured to drive the plurality of pixels in accordance with a multi-step process in which the capacitance of each capacitive pixel is measured at one point in time with the guard ring and conductive shield layer grounded and then measured at a second point in time with the guard ring and conductive shield layer pulsed with a signal that mimics a sensing pulse applied to a sensing area.

11. A portable acoustic device comprising:

a device housing comprising a speaker housing portion and a stem portion extending away from the speaker housing portion, wherein the speaker housing portion and stem portion combine to define an internal cavity within the device housing;

an acoustic port formed through a wall of the speaker housing portion and having an opening at an exterior surface of the device housing;

an audio driver disposed within the speaker housing portion and aligned to emit sound through the acoustic port;

a plurality of capacitive pixels disposed within the internal cavity, wherein each capacitive pixel comprises a stack of layers including: a first conductive layer comprising an active area and a guard ring surrounding and spaced apart from the active area, a conductive shield layer, and a dielectric layer disposed between the first conductive layer and the conductive shield layer; and sensor control circuitry disposed within the internal cavity and operatively coupled to drive the plurality of capacitive pixels at a predetermined frequency to readout a capacitance at each of the plurality of capacitive pixels and determine, based on an algorithm, if the portable acoustic device is within an ear of a user, wherein the sensor control circuitry is configured to apply a pulsed voltage to the guard ring and the conductive shield layer at a same frequency and time as the plurality of capacitive pixels are driven.

12. The portable acoustic device set forth in claim 11 wherein:

the device housing includes a housing wall that defines both an exterior surface of the earphone and an interior surface of the device housing;

the earphone further comprises a plurality of recessed regions formed in the housing wall; and each capacitive pixel in the plurality of capacitive pixels is disposed within a unique one of the plurality of recessed regions.

13. The portable acoustic device set forth in claim 12 wherein each capacitive pixel has a thickness of 100 microns or less and a diameter of a sensing area of each capacitive pixel in the plurality of capacitive pixels is 4 mm or less.

14. A portable acoustic device comprising:

a device housing comprising a speaker housing portion and a stem portion extending away from the speaker housing portion, wherein the speaker housing portion and stem portion combine to define an internal cavity within the device housing;

an acoustic port formed through a wall of the speaker housing portion and having an opening at an exterior surface of the device housing;

an audio driver disposed within the speaker housing portion and aligned to emit sound through the acoustic port;

a plurality of capacitive pixels disposed within the internal cavity, wherein each capacitive pixel comprises a stack of layers including: a first conductive layer comprising an active area and a guard ring surrounding and spaced apart from the active area, a conductive shield layer, and a dielectric layer disposed between the first conductive layer and the conductive shield layer; and sensor control circuitry disposed within the internal cavity and operatively coupled to drive the plurality of capacitive pixels at a predetermined frequency to readout a capacitance at each of the plurality of capacitive pixels and determine, based on an algorithm, if the portable acoustic device is within an ear of a user; and wherein the sensor control circuitry is configured to drive the plurality of pixels in accordance with a multi-step process in which the capacitance of each capacitive pixel is measured at one point in time with the guard ring and conductive shield layer grounded and then measured at a second point in time with the guard ring and conductive shield layer pulsed with a signal that mimics a sensing pulse applied to a sensing area.

* * * * *